Aug. 10, 1943.   R. J. BUSH   2,326,286

MACHINERY PACKING

Filed Nov. 1, 1941

INVENTOR
Russell J. Bush
BY
Evans + McCoy
ATTORNEYS

Patented Aug. 10, 1943

2,326,286

UNITED STATES PATENT OFFICE 2,326,286

MACHINERY PACKING

Russell J. Bush, Wabash, Ind., assignor to The General Tire & Rubber Company, Akron, Ohio, a corporation of Ohio Application November 1, 1941, Serial No. 417,518

2 Claims. (Cl. 288—3)

This invention relates to improvements in machinery packing and particularly to external oil or grease seals of the self-contained type.

The grease seals heretofore proposed have usually contained one or more metallic spring members which press against sealing members of leather, rubber, or the like. While such oil seals when properly assembled have usually been effective, it has often been difficult to properly center the component parts of the seal so that uniform pressure was obtained over the entire sealing edges.

Oil and grease seals which do not contain metallic springs have many inherent advantages over seals in which the metallic springs press against the sealing member. Oil seals heretofore proposed, using relatively resilient rubber as a spring to press against the sealing member, have not, however, been entirely satisfactory. In one type where a relatively heavy ring of resilient rubber is prevented from increasing in circumference by a close fitting casing, it is exceedingly difficult to obtain the desired concentration of pressure at the sealing edge or lip of the seal. This is apparently because a block of rubber has substantially greater compressive strength at its mid-portion than adjacent its edges. Another type, wherein the pressure is applied by a small band of rubber floating on the edge of the lip of the seal, is often not desirable because there is a substantial tendency for the diameter of the small band to increase in size due to the swelling of the rubber in use, and with the stiff stocks the sealing pressure may be insufficient. Such seals are not operable as external seals having the sealing edge of their outer periphery.

In the co-pending application Serial No. 417,517 of Howard M. Dodge of even date herewith and in the co-pending application of Howard M. Dodge, Serial No. 389,391, filed April 19, 1941, there are disclosed external and internal oil seals which substantially entirely overcome the disadvantages present in the moulded seals before produced. The seals therein disclosed function very efficiently and produce an excellent seal in cases where the shaft is not subjected to substantial wobble with respect to the housing. When, however, the shaft is subjected to wobble or is eccentric with respect to the housing so that the sealing lip is displaced to a considerable amount, it has been found that the seal sometimes fails to function properly.

It is an object of the present invention to provide an oil seal utilizing a relatively resilient moulded rubber-like material as a pressure member having the pressure strongly concentrated adjacent the sealing tip and which will provide a good seal with a wobbly or eccentric shaft.

It is another object of the present invention to provide a type oil seal that is relatively easy to assemble with its component parts in correct alignment and which will quickly follow a wobbly shaft to effect a good seal.

It is a further object of the present invention to provide oil seals having long wearing properties which are readily manufactured and are of comparatively low cost.

It is still a further object of the present invention to provide an external type oil seal which may be readily manufactured at relatively low cost and wherein the deformable members are entirely of moulded construction.

Other objects will be apparent from the following detailed description of the invention as illustrated by the accompanying drawing in which Figure 1 is a side elevational view of a seal embodying the present invention.

Figure 1:
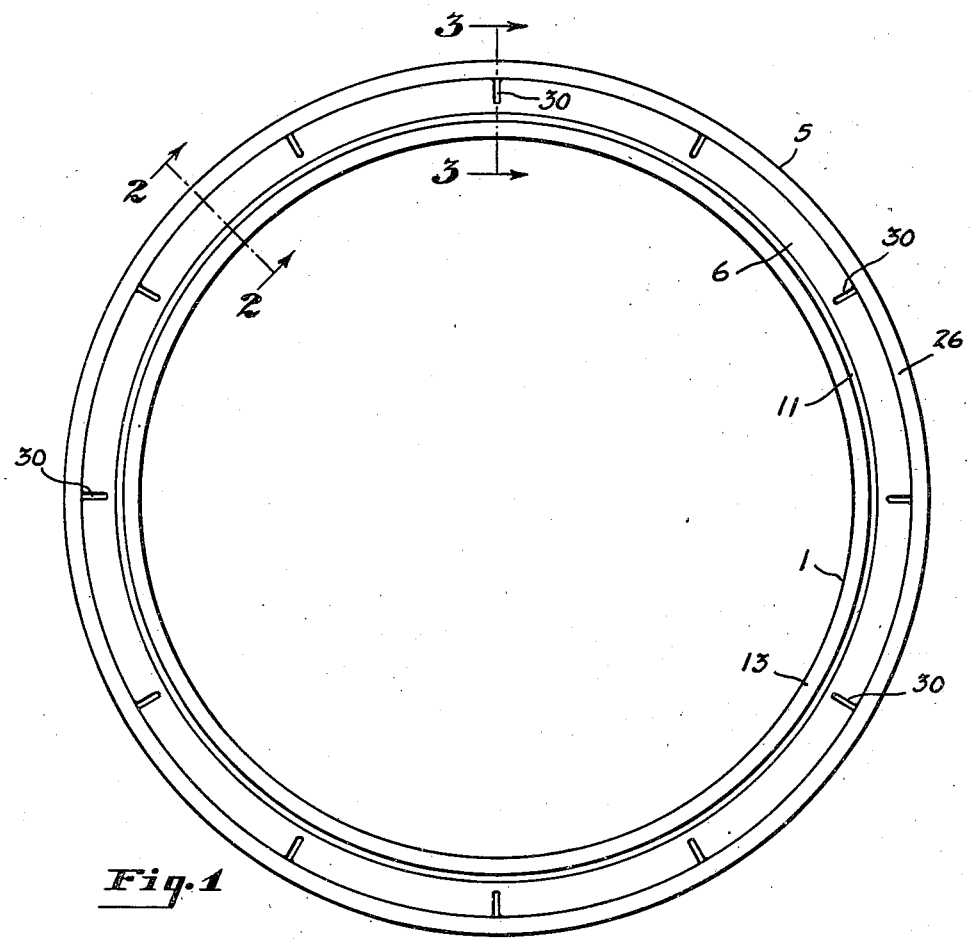
Figure 2:
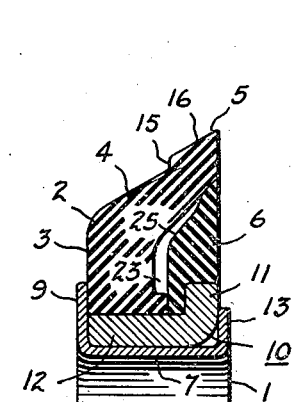
Fig. 2 is a sectional view of a portion of the seal on a line 2—2 of Fig. 1.
Figure 3:
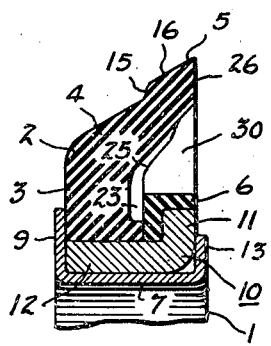
Fig. 3 is a sectional view of a portion of seal on a line 3—3 of Fig. 1.

Referring particularly to the drawing in which like parts are designated by the same numerals of reference throughout the several views, the seals of the present invention have a metal casing member 1 which is adapted to be rigidly held on a shaft (not shown), and to rotate therewith. An angle shaped moulded packing ring 2 having an annular radially extending portion 3 and an annular sealing portion 4 which terminates in a sealing lip 5 is rotatably carried by the casing 1. The sealing portion 4 of the moulded packing ring 2 extends at an angle to the radial portion 3 and an annular moulded pressure member 6 is carried by said casing within the re-entrant angle between the radial portion 3 and the sealing portion 4.

The casing 1 is generally U shaped; it has a cylindrical portion 7 which has an internal inner diameter such that it may be fixedly held in oil tight relation upon the shaft, an annular outwardly extending substantially radial backing portion 9, which is preferably attached to the cylindrical portion at one end thereof, and an annular restraining portion or member 10 which has an outwardly extending substantially radial annular portion 11, and preferably a stiffening cylindrical portion 12.

Means, such as a deformed edge portion 13, may be provided for maintaining the cylindrical and backing portions 7 and 9 respectively, in fixed rigid relation with the restraining member 10.

The packing ring 2 is moulded from a rubber-like material or synthetic rubber compound containing finely divided carbon and preferably some graphite and having a high degree of oil resistance and abrasion resistance. It preferably has a hardness of at least sixty on the durometer type A scale; a hardness or stiffness of between 65 and 80 is found to be preferable.

The sealing portion 4 of the moulded packing ring 2 preferably has generally a frusto-conical shape with a conical inner surface and a conical outer surface. It is inclined from the radial portion 3 in an outward direction toward the inner surface of the housing (not shown). It is preferably provided adjacent its free edge or sealing lip 5 with an annular shoulder 15 to form a relatively short wearing surface 16, which is preferably so designed in relation to the inner diameter of the housing against which it is to bear that it will be frusto-conical in its moulded state and yet be substantially cylindrical at least adjacent the sealing tip 5 when it is deformed by contact with the inner cylindrical surface of the housing. Preferably the radial portion 3 of the moulded packing ring has portions removed so that an annular groove 23 is formed adjacent the juncture of the inner conical surface and the radial flange 3. The groove 23 is important in increasing the flexibility of the sealing portion 4, in spacing the outer tapered surface of the pressure ring from all but the annular and adjacent the free end of said packing ring, and in providing a shoulder adjacent the periphery of the central aperture in the packing ring 2 so that sealing pressure between the radial portion of said pressure ring and said packing ring may be concentrated.

The pressure ring 6 is preferably of softer oil resistance synthetic rubber than that of the packing ring 2. For best results it should have a hardness of less than about 50 durometer A scale. The pressure ring 6 is carried by the restraining member of said casing within the annular space formed by the re-entrant angle between the sealing portion 4 and the radially extending portion 3 of the moulded packing ring. It has an outer tapered surface 25 which may also be frusto-conical in shape and which may be complimentary to the inner surface of the moulded packing ring 2. The surface 25 is adapted to bear against the inner surface of the packing ring only over the sealing lip 5 and adjacent the free end 26 of the sealing portion 4.

The moulded pressure ring is carried by the radial portion 11 of the restraining member 10 and it is preferably attached thereto by rubber to metal adhesion so that outward movement of its contact end beyond the free end 26 of the packing ring 2 causes tension in the area adjacent the inner surface 25 so as to provide a cantilever-like action or a heel and toe action which increases the concentration of pressure over the sealing lip 5 when the latter is deformed by contact with the inner cylindrical surface of the housing (not shown) on which it is adapted to bear.

I have found the apparent reason that the seals set forth in the above mentioned applications of Howard M. Dodge do not function as desired when the shaft is wobbly or eccentric is because a vacuum is formed between a moulded pressure ring 6 and the moulded packing ring 2. When the sealing portion 4 is substantially depressed by a wobbly shaft the volume of the groove 23 or space between the pressure member and the packing member is substantially decreased and the vacuum formed therein prevents the sealing lip from rapidly following the shaft.

In accordance with the present invention, therefore, venting means, such as one or more openings or slots 30 is provided for equalizing pressure between the pressure member and the packing ring. The venting means are preferably a plurality of slots through the lower portion of the pressure ring 6 and substantially uniformly spaced around its periphery. The vent means allows free passage of fluid into the groove 23 or space between the annular pressure member 6 and the packing ring 2 so that the sealing lip rapidly follows even a wobbly shaft.

The packing ring 2 is moulded so that the diameter of its outer periphery at the lip 5 is somewhat larger than the inner diameter of the housing. The pressure ring 6 is preferably moulded of sufficient diameter for its tapered end to be in contact with the inner conical surface of the packing ring when the latter is in the undeformed state. When the seal is applied to a shaft the packing 2 is deformed so that the sealing lip 5 bears against the entire inner surface of the housing, such deformation causing compression of the outer edge portion of the packing ring 6 between the sealing portion 4 of the packing ring 2 and the radially extending portion 11 of the restraining ring 10. The deformation of the sealing portion 4 by the housing also causes the inner portion of the pressure ring 6 to move outwardly resulting in tension in the inner edge portion so that a heel and toe or cantilever like action is hereby obtained to increase the pressure on the surface over the sealing lip adjacent free end 26.

It has been found that when the seal is applied to a shaft that the sealing lip 5 follows the shaft so that an excellent seal is produced even though the shaft rotates at a high speed in a wobbly or eccentric manner.

While the seal illustrated in the drawing and embodying the present invention is an external seal with outwardly opening U shaped casing which is to be maintained on the shaft to rotate therewith, it is obvious that the casing may be inwardly opening and fixedly mounted in the housing with the sealing tip 5 in contact with the shaft or rotating member without changing the spirit of the present invention.

It is also apparent that numerous modifications of the invention may be made without changing the spirit thereof, and it is intended that it be limited only by the appended claims.

What I claim is:

1. An oil-retaining device to seal a space between two relatively movable machine elements, which device comprises an annular C-shaped metal casing having a cylindrical portion adapted to be fixedly held in oil-tight contact with one of said machine elements, an annular substantially radial backing portion integral with said cylindrical portion, a rigid restraining member having a substantially radial portion and a portion extending in an axial direction, and means for holding said restraining member in spaced relation with said backing portion; an angle-shaped molded packing ring of oil-resistant rubberlike material and having a substantially annular radial flange disposed within said casing and bearing against said backing portion of said casing and a sealing portion integral with said annular radial flange in angular relation thereto and terminating in an annular sealing lip having a sealing surface adapted to bear against a machine element which is movable relatively to said casing, said sealing portion of said packing ring having a generally frusto-conical surface disposed opposite said sealing surface of said sealing lip and having adjacent the juncture of said frusto-conical surface and said radial flange an annular groove; and an annular pressure member of molded rubberlike material disposed within the re-entrant angle between said sealing portion and said annular radial portion of said packing ring, said pressure member having an unattached circumferential portion which bears against said frusto-conical surface of said sealing portion of said packing ring, and another circumferential portion attached to and rigidly held by said restraining portion of said casing, so that when said sealing portion of said packing ring is deflected by said shaft, outward lateral movement of the unattached circumferential portion of said pressure ring is resisted by stresses transmitted in cantilever manner from said circumferentially attached end of said pressure ring, said pressure ring also having a plurality of circumferentially spaced longitudinal slots therethrough to vent the space between said pressure member and said packing ring.

2. An oil-retaining device to seal a space between two relatively movable machine elements, which device comprises an annular C-shaped metal casing having a cylindrical portion adapted to be fixedly held in oil-tight contact with one of said machine elements, an annular substantially radial backing portion integral with said cylindrical portion, a rigid restraining member having a substantially radial portion and a portion extending in an axial direction, and means for holding said restraining member in spaced relation with said backing portion; an angle-shaped molded packing ring of oil-resistant rubberlike material and having a substantially annular radial flange disposed within said casing and bearing against said backing portion of said casing and a sealing portion integral with said annular radial flange in angular relation thereto and terminating in an annular sealing lip having a sealing surface adapted to bear against a machine element which is movable relatively to said casing, said sealing portion of said packing ring having a generally frusto-conical surface disposed opposite said sealing surface of said sealing lip; and an annular pressure member of molded rubberlike material disposed within the re-entrant angle between said sealing portion and said annular radial flange of said packing ring, said pressure member having an unattached circumferential portion which bears against said frusto-conical surface of said sealing portion of said packing ring, and another circumferential portion attached to and rigidly held by said restraining portion of said casing, so that when said sealing portion of said packing ring is deflected by said shaft, outward lateral movement of the unattached circumferential portion of said pressure ring is resisted by stresses transmitted in cantilever manner from said circumferentially attached end of said pressure ring, said pressure ring also having a plurality of circumferentially spaced longitudinal slots therethrough to vent the space between said pressure member and said packing ring.

RUSSELL J. BUSH.